June 15, 1943.   J. R. BARDSLEY   2,321,727
INSULATING FINISH FOR APPARATUS CASES
Filed April 15, 1942
FIG. 1
FIG. 2
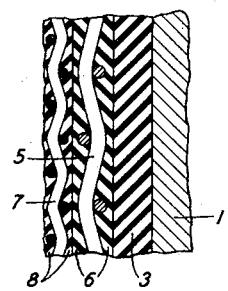
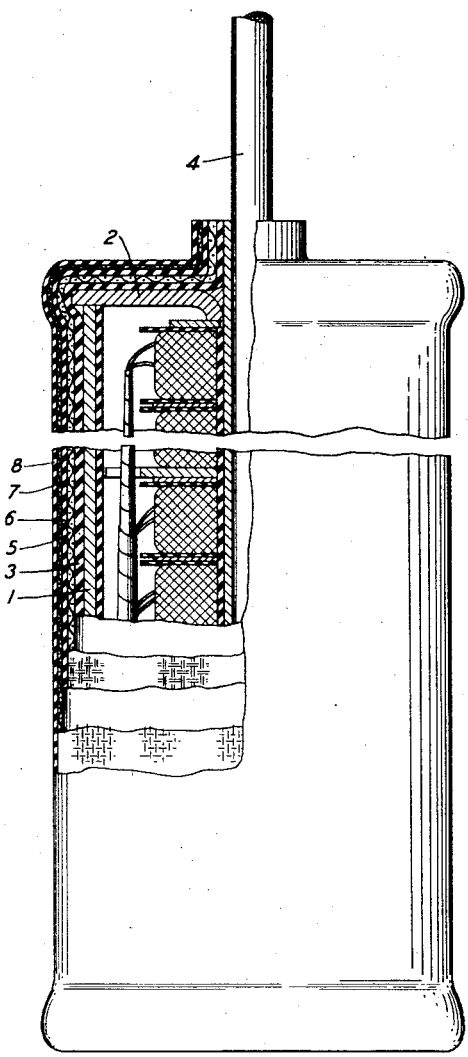
INVENTOR
J. R. BARDSLEY
BY
B. H. Jackson
ATTORNEY Patented June 15, 1943

2,321,727

UNITED STATES PATENT OFFICE 2,321,727

INSULATING FINISH FOR APPARATUS CASES

Joseph R. Bardsley, Yonkers, N. Y., assignor to Bell Telephone Laboratories, Incorporated, New York, N. Y., a corporation of New York Application April 15, 1942, Serial No. 439,089

1 Claim. (Cl. 174—50)

The invention relates to cases for housing electrical apparatus and more particularly to the finish applied to the exterior of such cases.

When electrical cables or conductors are laid underground, it is the usual practice to provide special conduits therefor and when apparatus is to be inserted in such conductors or cables special underground pits are provided in which the apparatus is installed.

To expedite the installation of transmission lines and to keep the cost thereof to a minimum, electrical cables or conductors are sometimes laid directly in the soil. Cases for housing certain apparatus required in such transmission lines are also installed directly in the soil. In some sections of the country, these underground installations are subject to attack by rodents, particularly gophers. Also where the soil is of an acid nature, electrolysis or corrosion soon destroys the underground cases. Frequent replacement of such apparatus cases is required which tends to offset the economical gain of placing the lines and apparatus directly in the soil.

It is an object of this invention to protect underground apparatus cases from the attacks of rodents and from destruction due to electrolysis and corrosion.

To give this protection according to this invention the apparatus cases are first covered with a sheet of thermoplastic compound. Over this sheet is placed woven wire cloth or screen to which is applied a coating of a bituminous product. Over this is wrapped a textile covering and then a final coat of bituminous product.

The invention will be better understood from the following description together with the attached drawing, Fig. 1 of which is an elevation of an electrical apparatus case, shown partly broken away to show the details of the coating; and Fig. 2 is an enlarged view of a section of the coating.

For illustrative purposes, a loading coil case of the general type of United States Patent 2,005,582 to F. J. Given has been chosen. Such a case comprises a generally cylindrical body 1 of lead or steel which may be seamless or in which the seam may be welded. Top and bottom covers are welded to the cylindrical body 1. Top cover 2 is provided with a hole through which a suitably protected lead sheathed cable 4 enters the case. The conductors of the cable are fanned out in the usual manner to the enclose loading coils.

Since the loading coil case per se and the manner of mounting the coils therein are not the controlling elements of the invention, no further description thereof is considered necessary. The invention is essential only where the apparatus cases are of electrically conductive material and must be insulated from ground and protected from animal attack.

As shown in the drawing, the body of the case is completely covered with a sheet of thermoplastic compound 3 about .06 inch thick. Over the sheet of thermoplastic compound is a covering 5 of galvanized iron wire cloth or equivalent wire mesh. Over the wire cloth is a coating of a bituminous enamel 6, a cloth wrapping 7 and a second coating 8 of bituminous enamel.

As will be understood, the first coating of bituminous enamel 6 will enter the meshes of the wire cloth 5 and the second coating 8 of bituminous enamel will penetrate the wrapping 7 so that the various layers of finish on the case will be somewhat as indicated in Fig. 2 rather than in distinct layers as indicated in Fig. 1. Fig. 1, in effect, shows the steps of applying the finish while Fig. 2 shows the completed finish.

In applying the thermoplastic compound to the case any good thermoplastic cement may be used which, of course, is applied over the entire exterior of the case.

One form of thermoplastic compound which has been found very satisfactory contains the following ingredients:

|  | Parts by weight, approximately |
|---|---|
| Reclaimed rubber | 40 |
| Dixie clay | 43 |
| Mineral rubber | 12 |
| Resin | 4 |
| Paraffin | 1 |

The bituminous enamel used in the coating may be "Biturine" enamel which is a product of the General Paint Corporation of Chicago, Illinois. The wire cloth is preferably of galvanized iron wire, 8 mesh, .028 inch diameter wire, .096 inch openings. The cloth wrapping may be a suitable unbleached cotton cloth.

The invention may be carried out in other specific ways than those herein set forth without departing from the spirit and essential characteristics of the invention and the present embodiments are, therefore, to be considered in all respects as illustrative and not restrictive, and all changes coming within the meaning and equivalency range of the appended claim are intended to be embraced therein.

What is claimed is:

A loading coil housing for underground installation in direct contact with the soil including a metallic container in which the loading coils are adapted to be disposed, and protecting means for said container, said protecting means comprising a layer of electrically insulating thermoplastic compound applied directly to substantially all the external surface of said container, a layer of wire cloth extending over substantially all portions of said thermoplastic layer, and a layer of a bituminous product in which said wire cloth is completely embedded.

JOSEPH R. BARDSLEY.